(12) United States Patent
Post

(10) Patent No.: US 8,264,121 B2
(45) Date of Patent: Sep. 11, 2012

(54) ELECTROSTATIC GENERATOR/MOTOR CONFIGURATIONS

(75) Inventor: Richard Freeman Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 156 days.

(21) Appl. No.: 12/894,612

(22) Filed: Sep. 30, 2010

(65) Prior Publication Data

US 2011/0031844 A1  Feb. 10, 2011

Related U.S. Application Data

(63) Continuation-in-part of application No. 11/932,329, filed on Oct. 31, 2007, now Pat. No. 7,834,513.

(60) Provisional application No. 60/971,186, filed on Sep. 10, 2007, provisional application No. 61/366,293, filed on Jul. 21, 2010.

(51) Int. Cl.
*H02N 1/00* (2006.01)

(52) U.S. Cl. .................................................... 310/309

(58) Field of Classification Search .................. 310/300, 310/308, 309
See application file for complete search history.

(56) References Cited

U.S. PATENT DOCUMENTS

| | | | | |
|---|---|---|---|---|
| 2,194,839 | A * | 3/1940 | De Graaff et al. | 310/309 |
| 3,210,643 | A * | 10/1965 | Else et al. | 322/2 A |
| 3,629,624 | A * | 12/1971 | Staudte | 310/309 |
| 4,897,592 | A * | 1/1990 | Hyde | 322/2 A |
| 6,353,276 | B1 * | 3/2002 | Gendron | 310/309 |
| 2006/0214535 | A1 * | 9/2006 | Salmon | 310/309 |

\* cited by examiner

*Primary Examiner* — Thanh Lam
(74) *Attorney, Agent, or Firm* — John P. Wooldridge

(57) ABSTRACT

Electrostatic generators/motors designs are provided that include a stator fixedly connected to a first central support centered about a central axis. The stator elements are attached to the first central support. Similarly, a second stator is connected to a central support centered about the central axis, and the second stator has stator elements attached to the second central support. A rotor is located between the first stator and the second stator and includes an outer support, where the rotor is rotatably centered about the central axis, the rotor having elements in contact with the outer support, each rotor element having an extending rotor portion that extends radially from the outer support toward the axis of rotation.

21 Claims, 7 Drawing Sheets

ELECTROSTATIC GENERATOR/MOTOR CONFIGURATIONS

CROSS-REFERENCE TO RELATED APPLICATIONS

This application is a continuation-in-part of U.S. patent application Ser. No. 11/932,329 titled "An Improved Electrostatic Generator/Motor," filed Oct. 31, 2007, now U.S. Pat. No. 7,834,513 incorporated herein by reference. U.S. patent application Ser. No. 11/932,329 claims priority to U.S. Provisional Patent Application Ser. No. 60/971,186, titled "An Improved Electrostatic Generator/Motor," filed Sep. 10, 2007, incorporated herein by reference. This application claims the benefit of U.S. Provisional Patent Application No. 61/366,293 titled "Method for Supporting Passive Magnetic Bearing and other Elements on the Expanding Inner Surface of a Flywheel Rotor," filed Jul. 21, 2010, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to electrostatic generators and motors, and more specifically, it relates to improvements in their configurations.

2. Description of Related Art

Early work performed by John Trump examined theoretically and experimentally a new form of electrostatic generator/motor that was especially suitable for use in a vacuum environment. Subsequent workers employed his ideas in their designs. Trump's generator/motor consisted of interleaving fan-like condenser plates, consisting of "stators" and "rotors." The stator assembly was supported on insulators, and the rotor "fans" were mounted on a rotating shaft. As the rotor rotated, the capacitance between the stator and rotor would vary between a maximum value, when the blades were directly opposite to each other, to a minimum value when the rotor blades faced the gaps between the stator blades. In many of Trump's generator/motors, "brushes" made contact with the rotor blade shaft to provide a means of electrical connection to the rotor blade assembly.

To operate Trump's devices as a generator, a potential was established between the stator and rotor by connecting them to a DC power supply through a high-resistance "charging resistor". Once the condensers reached the full electrical potential, no further charge was drawn from the power supply. However, when the rotor was spinning, the potential between stator and rotor would have an alternating current component, as a natural consequence of the time variation of the capacitance, as given by the equation:

$$V[t] = \frac{Q_0}{C[t]}, \quad [1]$$

where $Q_0$ (coulombs) is the (fixed) charge on the condenser, and $C[t]$ (farads) is the capacity of the time-varying capacitor.

The time-variation of capacity of an actual fan-like capacitor made up of a stationary and a rotating set of sector plates can be modeled reasonably well by the expression:

$$C[t] = C_0 \left( \frac{(1 + k \cos[\omega t])}{1 + k} \right), \quad k < 1, \quad [2]$$

where $C_0$ is the value of the capacity of the condenser at its maximum, and $\omega$ is the angular frequency of variation of the capacity as it cycles between its maximum and its minimum value.

Inserting Eq. 2 into Eq. 1, one can calculate the variation in potential for a given set of values for $Q_0$, $C_0$, k, and $\omega$. If we take $Q_0 = V_0 C[0]$ as the initial charge (at t=0, a time when the capacity has its maximum value), then we may plot the potential across the capacitor as a function of time (in the absence of any loads connected to its terminals. A large AC component is superposed on the DC level. It is desirable to make optimum use (both electrically and geometrically) of this driver in order to maximize the power output of the generator. As will be shown, the special rotor-stator configurations and circuits that are the subject of this disclosure represent a major improvement over the simple configurations studied by Trump and by others following him.

SUMMARY OF THE INVENTION

The invention provides embodiments of electrostatic generators and electrostatic motors. These devices generally include at least one central support centered about a central axis; a first stator fixedly connected to the at least one central support, where the first stator comprises a plurality of first stator elements, where at least one first stator element of the plurality of first stator elements has a non-angled edge; a second stator fixedly connected to the at least one central support, the second stator comprising a plurality of second stator elements fixedly attached to the at least one central support, where at least one second stator element of the plurality of second stator elements has a non-angled edge; an outer support rotatably centered about the central axis; and a rotor located between the first stator and the second stator, where the rotor comprises a plurality of rotor elements in contact with the outer support, where at least one rotor element of the plurality of rotor elements has a non-angled edge.

Many variations of the general embodiment are provided. Some of these variations are stated as follows. The at least one first stator element comprises a first stator extension that extends radially from the at least one central support, where the at least one second stator element comprises a second stator extension that extends radially from the at least one central support and where the at least one rotor element comprises a rotor element extension that extends radially from the outer support toward the axis of rotation. At least one of the first stator extension, the second stator extension and the rotor extension comprises a cross-sectional shape selected from the group consisting of a circle and an ellipse. At least one of the first stator extension, the second stator extension and the rotor extension comprises a shape selected from the group consisting of a rod and a cylinder. At least one of the first stator extension, the second stator extension and the rotor extension is tapered. At least one of the first stator extension, the second stator extension and the rotor extension is tapered from a first width near the central axis to a second width radially away from the central axis, where the second width is greater than the first width. One of the first stator elements or the second stator elements are electrically connected together into two groups, forming thereby a first group of connected stator elements connected to a first electrical lead and a second group of connected stator elements connected to a second electrical lead. The first group of connected stator elements are connected in parallel to the first electrical lead and where the second group of connected stator elements are connected in parallel to the second electrical lead. The first electrical lead is connected to a first capacitor, the apparatus further comprising a first charging circuit attached to the first electrical lead, where the first charging circuit comprises a first inductor, where the first inductor and first capacitor form an LC circuit resonant within a band of frequencies, where when the first rotor rotates, an output at the first electrical lead will have at least one frequency within the band, where the second electrical lead is connected to a second capacitor, the apparatus further comprising a second charging circuit attached to the second electrical lead, where the second charging circuit comprises a second inductor, where the second inductor and second capacitor form a second LC circuit resonant within the band of frequencies, where when the second rotor rotates, a second output at the second electrical lead will have at least one frequency within the band. At least one of the first electrical lead and the second electrical lead is connected to a capacitor, the apparatus further comprising a charging circuit attached to the one of the first electrical lead and the second electrical lead that is connected to the capacitor, where the charging circuit comprises an inductor, where the inductor and the capacitor form an LC circuit resonant within a band of frequencies and where when the rotor rotates, an output from the one of the first electrical lead and the second electrical lead that is connected to the capacitor will have at least one frequency within the band. When the first electrical lead has at least one frequency within the band, the second electrical lead is grounded and where when the second electrical lead has at least one frequency within the band, the first electrical lead is grounded. When the first electrical lead is connected to the capacitor, the second electrical lead is connected to ground and where when the second electrical lead is connected to the capacitor, the first electrical lead is connected to ground. At least one of the first stator, the second stator and the rotor comprises a material selected from the group consisting of a dielectric material and metal. At least one of the first stator, the second stator and the rotor comprise a metal-coated dielectric material. At least one of the first stator, the second stator and the rotor comprise a corrugated surface. The corrugated surface comprises an annular disc. The corrugated surface comprises a material selected from the group consisting of a dielectric material, a metal and a metal-coated dielectric material. The apparatus further comprises means for the outer support to expand due to rotational forces. The means for the outer support to expand due to rotational forces comprises cuts in the outer support, where the cuts extend radially partially through the outer support. Each first stator element of the plurality of first stator elements is spaced apart from each other the each first stator element, where each second stator element of the plurality of second stator elements is spaced apart from each other the second stator element and where each rotor element of the plurality of rotor elements is spaced apart from each other the each rotor element.

Another general embodiment of the invention includes at least one central support centered about a central axis; a first stator fixedly connected to the at least one central support, where the first stator comprises a plurality of first stator elements; a second stator fixedly connected to the at least one central support, the second stator comprising a plurality of second stator elements fixedly attached to the at least one central support; an outer support rotatably centered about the central axis; and a rotor located between the first stator and the second stator, where the rotor comprises a plurality of rotor elements in contact with the outer support, where each first stator element of the plurality of first stator elements is spaced apart from each other the each first stator element, where each second stator element of the plurality of second stator elements is spaced apart from each other the second stator element and where each rotor element of the plurality of rotor elements is spaced apart from each other the each rotor element.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Embodiments of the electrostatic generator/motor of U.S. patent application Ser. No. 11/932,329 include several geometrical configurations for the variable condenser element of the generator/motor. The present invention includes new configurations for that element. These configurations have important advantages in terms of electrical performance, mechanical rigidity and simplified construction.

Figure 1:
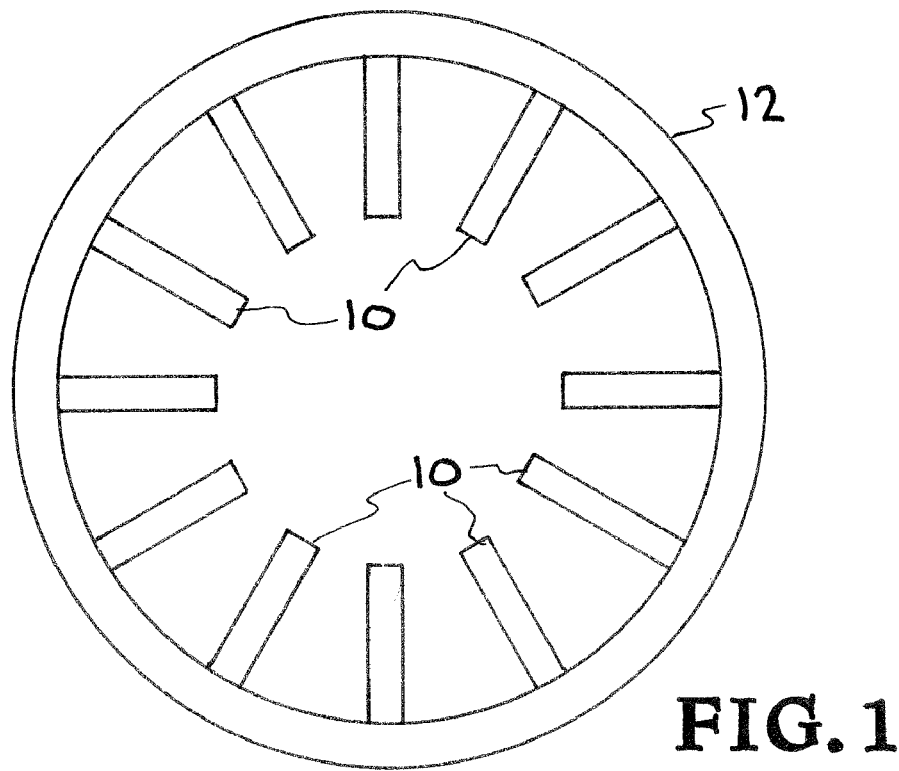
FIG. 1 shows a schematic drawing of a present rotor spoke assembly.
Figure 2:
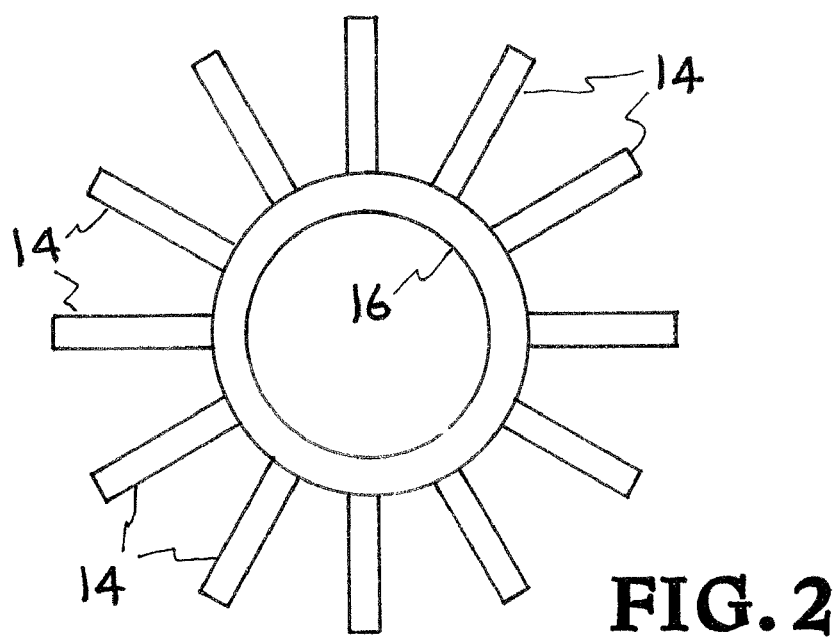
FIG. 2 shows a schematic drawing of a present stator spoke assembly

One embodiment of the new configuration has rotor and stator elements that have a shape that increases the element's standoff voltage. Exemplary shapes are tubes or rod and exemplary cross-sections of the shapes may be circular or elliptical. The variable condenser of the generator/motor is made up of successive layers of these rods or cylinders arranged in a form resembling the spokes on a wheel. FIG. 1 depicts an exemplary rotor of the present invention and includes rotor elements, as exemplified by element 10, (which can be, e.g., rods or tubes) supported by a support structure 12. FIG. 2 depicts an exemplary stator of the present invention and includes stator elements, as exemplified by element 14, supported by a central support structure 16. Stator elements 14 can be configured, e.g., as metallic rods or tubes. A basic configuration of an electrostatic generator/motor according to the present invention begins with a stator at the bottom of the stack. As shown in FIG. 2, the stator is supported by an inner structure. The next layer above the bottom stator is a rotor having the outer ends of its rotor elements (spokes) mechanically secured by support structures on the inner surface of a cylinder, e.g. the inside surface of a flywheel rotor made of fiber composite. Such a support structure is illustrated in FIG. 1. The next layer up would be another stator, and so forth. Electrical connections can be made to each of the stationary spokes to charge them so as to either extract power when the system is in a generator mode, or to provide electrical drive power when the system is in a motor mode. In exemplary applications of the invention, all of the spokes of a given stationary layer would be charged to a given potential with stationary layers above and below that layer either grounded or charged to an opposite-sign potential. This charging pattern would eliminate spoke-to-spoke potential differences for any given stationary layer. An alternative charging pattern would be for the spokes of each stationary layer to be charged alternately positively or negatively, with the corresponding spokes of the stationary layer above and below this layer being charged alternately negatively and positively. In this way the rotating spokes pass alternately through regions with upward and downward directed electric fields. This alternating gradient action inhibits the build-up of static charges on the rotating rods, which are insulated from electrical contact with ground. In some embodiments, the potential of a rotor is allowed to float. The electrical connections and charging patterns provided herein are exemplary and not limiting.

In addition to advantages of a mechanical nature there are other advantages of the rod/tube geometry. As described in Alston's book on high voltage technology, the voltage-holding ability between rods with a circular cross-section is enhanced over what it would be if the electrodes were planar. From the data presented in Alston, at a gap of 0.5 mm, the breakdown voltage between two electrodes having a radius of curvature of 6 mm is about 60 kilovolts, compared with the breakdown voltage of 45 kilovolts between two near-planar surfaces. Since the power output of an electrostatic generator varies as the square of its operating voltage, the ratio of powers for this example would be 16/9, i.e., 167 percent.

A computer code has been written to calculate the capacity maximum for the structure shown in FIG. 1. Calculations were performed with this code for a set of dimensions appropriate for a 5 KWh flywheel rotor fabricated from E-glass fiber composite. The flywheel rotor inner radius was 0.225 meters, and the inner radius of the array of rotating rods (or, e.g., tubes) was taken to be 0.10 meters, so that their length was 0.125 meters. The diameter of the rods (or tubes) was 10 mm. At the inner edge of each layer of rods/tubes the spacing between adjacent rods was also taken to be 10 mm, so that there were 31 rods in each layer. The number of vertical cell layers was then equal to 11. The total rod/cell count was 713. With these parameters the code predicted a maximum capacity value of 0.00134 mfd. The maximum rotation speed of the flywheel rotor was 20,000 RPM so that the output frequency of the generator, being the product of the number of rods/tubes per layer multiplied by the revolutions per second of the rotor, was approximately 10 kHz. When these two numbers were introduced into our electrostatic generator code, the predicted output power was 5 kW at a conservative voltage-per-gap of 20 kilovolts. For bulk storage applications, this level of power is more than adequate for a 5 kWh storage module. The predicted efficiency of the generator itself was 0.99, not counting the (typically small) losses in the rectifiers and inverter required to produce 60 Hz output.

The description of the invention up to this point has assumed that each one of the rods/tubes of the generator/motor is made of metal. There could be cases where it would be advantageous for mechanical or electrical reasons to replace the metallic rod/tube rotating arrays by rods/tubes made of a dielectric material, such as is the case in examples in U.S. patent application Ser. No. 11/932,329, incorporated herein by reference. Similar calculations could be performed for such cases, which by their nature would yield somewhat lower maximum capacity values. Another variation on this theme would be to use metallic rods/tubes but to cover either the rotating arrays or the stationary arrays (or both) with a layer of insulating material. The presence of such coatings could have the effect of increasing the voltage-breakdown limit of the system. At typical thicknesses of such layers, their presence should have a minimal effect on the capacity maximum of the system.

Figure 3:
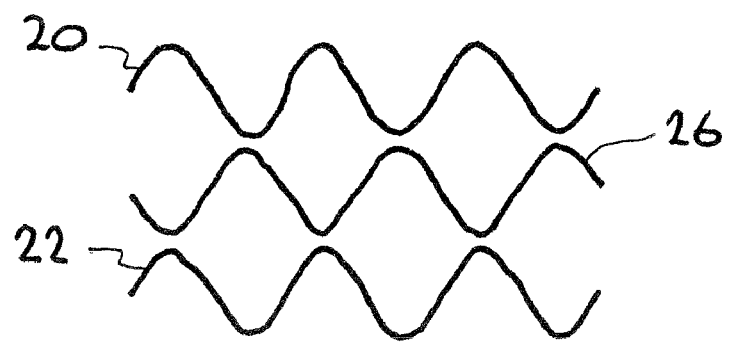
FIG. 3 shows a side view of a portion of a rotating capacitor formed of corrugated metal sheets in the position of maximum capacity.
Figure 4:
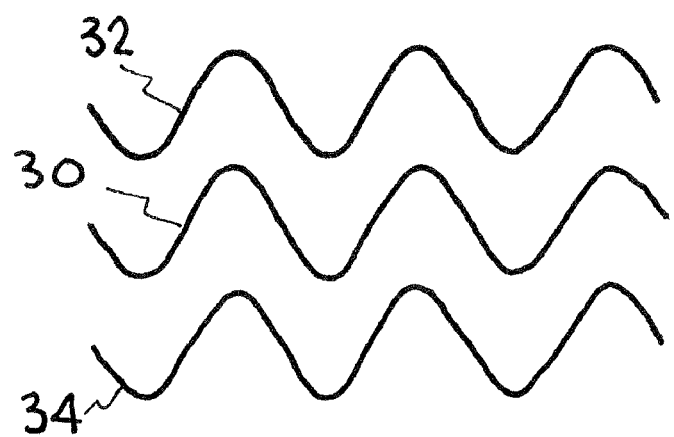
FIG. 4 shows a side view of a portion of a rotating capacitor formed of corrugated metal sheets in the position of minimum capacity.

An alternate way to construct a condenser characterized by curved surfaces moving with respect to one another is to form corrugated surfaces of thin annular discs made of, e.g., stainless steel sheet. These discs are assembled to form the condenser by stacking alternating layers of stationary and rotating discs. FIG. 3 shows one cell of such an array, in the position of maximum capacity between the upper stationary disc 20 and the lower stationary disc 22 and the rotating disc 26 between them. FIG. 4 shows the rotating disc 30 displaced in phase to the position of minimum capacity, with respect to upper stationary disc 32 and lower stationary disc 34. The capacities and capacity ratios can be calculated in the same way that the capacities of the rod system were calculated.

Some embodiments of this invention mount the components of an electrostatic generator on a support surface that is in contact with the inner surface of the flywheel rotor which expands outwardly as a result of centrifugal forces. The support system must be capable of accommodating to this expansion without subjecting the supported elements to azimuthal tensile forces that could rupture them and without materially affecting the balance of the rotor.

Figure 5:
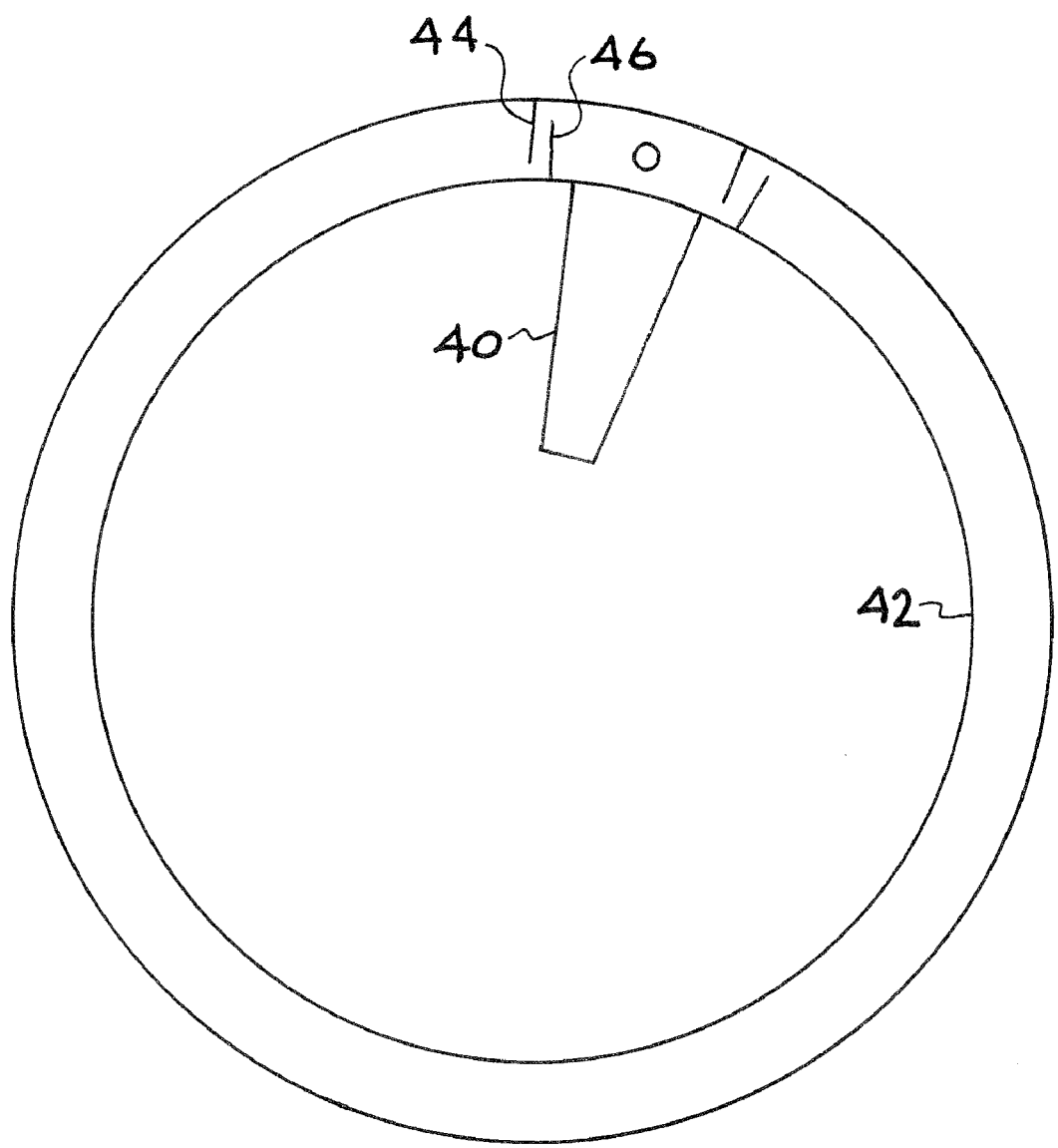
FIG. 5 shows a slotted clamping ring and a sector of a supported element.

As shown in FIG. 5, the concept involves two specific design features. The first of these is to separate the supported elements into a number of pie-shaped sectors, as exemplified by the single element 40, so that no hoop tension can develop within the array as the flywheel rotates. In order to form the entire array these sectors are then attached at their outer edges to a support 42 (e.g., clamped between two clamping rings) that is in supported radially by the inner surface of the flywheel rotor. This support is partially cut through, one cut 44 from the outside in, and the second adjacent cut 46 from the inside out, at azimuthal positions corresponding to the edges of the sectors that are supported. In this way the support is able to expand radially while still supporting the sectors in a way that allows only radially directed forces to be exerted on them so that there is no need for the sectors to expand azimuthally in order to accommodate to the increasing inner circumference of the flywheel rotor or the clamping rings. In actual practice, the calculated increase in radius of a typical flywheel rotor would be of the order of a centimeter or two. If the number of sectors is sufficiently large, the flexing of the stress-relieving cuts in the clamping rings would be small enough to avoid failure of the bridging strips from metal fatigue.

If the stress-relieving cuts are all made with the same depth and spacing, the expansion of the support (e.g., clamping rings) will not appreciably effect the rotor balance as it speeds up, since the radial displacement of each of the sector regions will then be closely the same. In the case of the elements of the passive magnetic bearing, expansion of the rotor will lead to the appearance of a small gap between adjacent sectors. Since there will be many sectors involved these gaps will be very small and should have a negligible influence on the performance of the hearing element. A similar comment applies to the sectors of the electrostatic generator/motor assembly.

Some embodiments of the invention further include techniques for increasing voltage gradient breakdown limits between conductors in a vacuum. Examples usable in the present invention follow a preliminary discussion.

There are many situations in high-voltage electrical technology where it is important to operate in vacuo at very high electric field gradients. The limits on the field gradient are imposed by the need to avoid electrical breakdown between the conducting surfaces. Improved means for increasing the ability of charged electrodes in a vacuum to withstand higher voltages between them is provided. The new concepts described are based on an older concept—"magnetic insulation"—but employ new embodiments of electrodes and magnetic fields with special shaping of both the electrode surfaces and the magnetic field lines. They also involve new applications of the concept that can act to enhance the performance of high-voltage electrical machinery.

In vacuo, the electrical breakdown process can be described as a self-perpetuating avalanche of counter-flowing electrons and ions between the two conducting surfaces across which the electrical gradient occurs. A simplified description of such an avalanche is the following: In the presence of the high field gradient, an ion may be released from the positively charged surface. This ion will then be accelerated by the field gradient and will subsequently impact the negatively charged electrode, releasing secondary electrons. These electrons will then be accelerated back across the gap, impacting the positively charged electrode, releasing more ions, and thus giving rise to a cascade of counter-flowing electrons and ions, i.e., to electrical breakdown.

As is well known, in the presence of a sufficiently strong magnetic field parallel to the surface of the negatively charged electrode (from which the electrons are emitted in an avalanching electrical discharge in a vacuum), any electrons leaving the surface will have their orbits turned back toward the surface, thus preventing the development of an avalanching electrical breakdown. The equation describing this effect, called the "magnetron cutoff equation," has the form given in Equation 1.

$$V_{crit} = \frac{1}{2}\left(\frac{q_e}{m_e}\right)^2 (B \cdot S)^2 \text{ Volts} \quad (3)$$

Here $q_e$=electronic charge, Coulombs, $m_e$=mass of the electron, kilograms. The strength of the magnetic field is B (Tesla), and the inter-electrode gap=s (meters).

Figure 6:
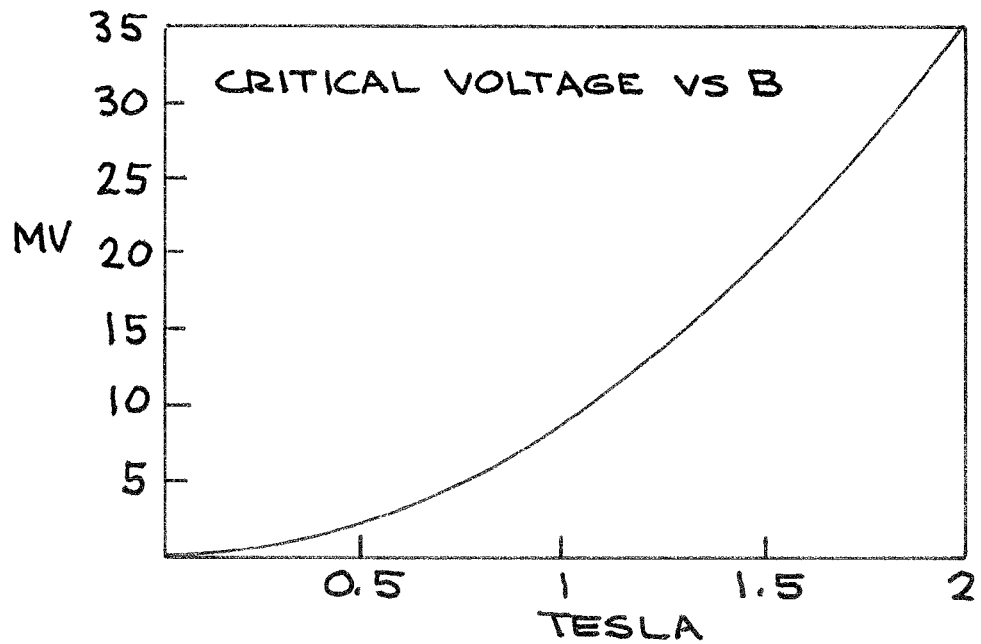
FIG. 6 is a plot of Critical voltage vs magnetic field as calculated from Equation 3, for a gap of 10.0 mm.

FIG. 6 shows a plot of this critical voltage (in MV) vs B(Tesla), as calculated from Equation 3, for the case where s=10.0 mm.

Figure 7:
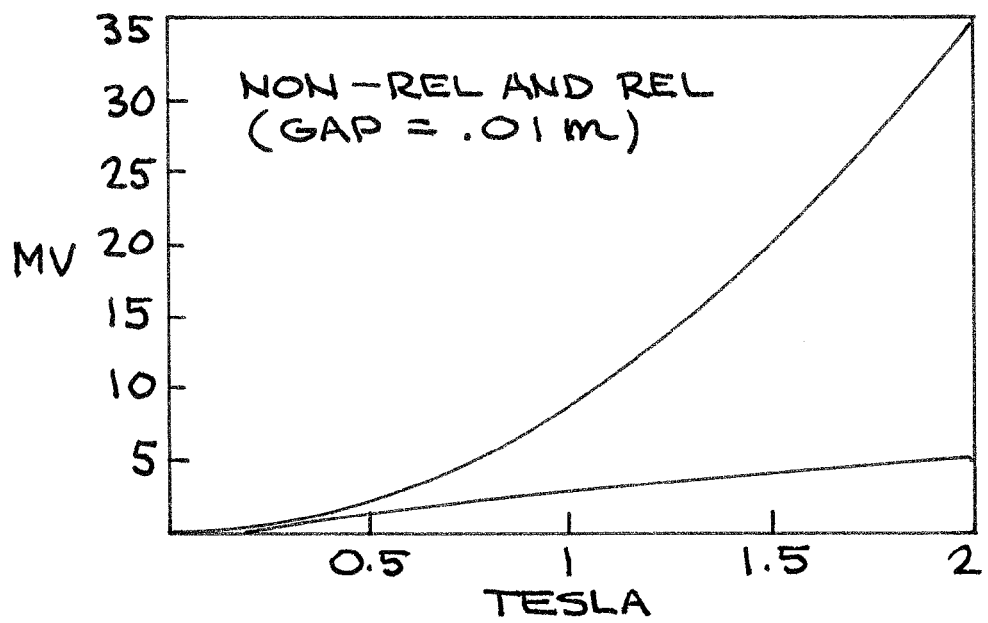
FIG. 7 shows comparison plots for the non-relativistic magnetron cutoff equation (upper plot) and the relativistic form of the magnetron cutoff equation (lower curve).

As can be seen, at magnetic fields larger than about 0.5 Tesla the critical voltage is in excess of 1.0 million Volts. Since the energy-equivalent of the rest mass of the electron is 0.511 MeV, from FIG. 6 it can be inferred that it is necessary to consider relativistic effects in calculating the critical voltage at magnetic fields in excess of about 0.3 Tesla. A relativistic formulation of the cutoff condition has been made in order to determine the magnitude of the correction to the non-relativistic Equation 3. FIG. 7 compares the results shown in FIG. 6 (upper curve) with those obtained from the relativistic formulation.

Although the cutoff values calculated from the relativistic formulation of the magnetron cutoff equation are substantially lower than the non-relativistic values, they are still very high at fields of order 1 Tesla or greater. Specifically, holding off electric potentials of order 5 million volts over a gap of 10 millimeters, corresponding to a gradient of 500 million volts per meter, is substantially in excess of the breakdown gradients typical of those encountered with vacuum-insulated electrodes in the absence of a magnetic field. In the next Section some novel embodiments of magnetic insulation will be discussed.

There are situations where it is required to suppress electrical breakdown in vacuum between conducting surfaces the dimensions of which are large enough to make it difficult to employ the concept of magnetic insulation. An example of the use of magnetic insulation is the use of external magnet coils to create strong magnetic fields the field lines of which are everywhere parallel to the conducting surfaces, as required in order to take advantage of the magnetron-cutoff effect. Ideally, much would be gained if the desired result could be obtained by using permanent-magnet elements to create the required magnetic field. The problem to be solved in this case is how to create a situation where the field lines produced by the permanent magnets have essentially the same geometrical configuration as the conducting surface. This problem can be solved in the following way: First, the conducting surface is accordion-like in that it is formed with a periodic wave-like pattern of ridges and troughs. Second, the magnetic blocks of Halbach arrays are nested into the back surface of the conductor. By design the magnetic field lines of the Halbach arrays are made to conform (except at the bottom of the troughs) to the rippled conductor surface. The electric field that exists at the conductor surface has it maximum values at the peak of the ridges, falling to much smaller values at the bottoms of the troughs. In this way all parts of the conducting surface that is exposed to high electric fields because of the presence of oppositely charged adjacent conducting surfaces will be able to take advantage of the magnetron-cutoff suppression of electrically breakdown.

Figure 8:
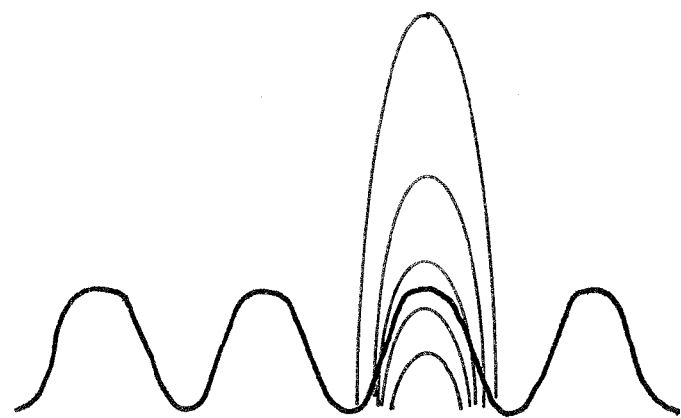
FIG. 8 illustrates a rippled conductor surface with superposed plot of magnetic field lines of a Halbach array located below the surface of the conductor.

FIG. 8 illustrates the situation described above, as depicted by a rippled conducting surface 50 plotted together with the calculated field lines 52 from a Halbach array located at the back surface of the conductor.

Using this technique localized magnetic fields with field lines nearly parallel to the conducting surface (except at the bottoms of the trough, where the electric field is much smaller than at the ridges) are created. Approximate calculations based on the use of the relativistic magnetron-cutoff equation indicate that electric potentials of one million volts or more could be sustained between two closely spaced large-area conducting surfaces when high-field (e.g., NdFeB) permanent magnets are used in the Halbach arrays behind the surfaces.

Among the possible applications of the above-described concept are its use in particle accelerators and in HCDC transmission lines.

Figure 9:
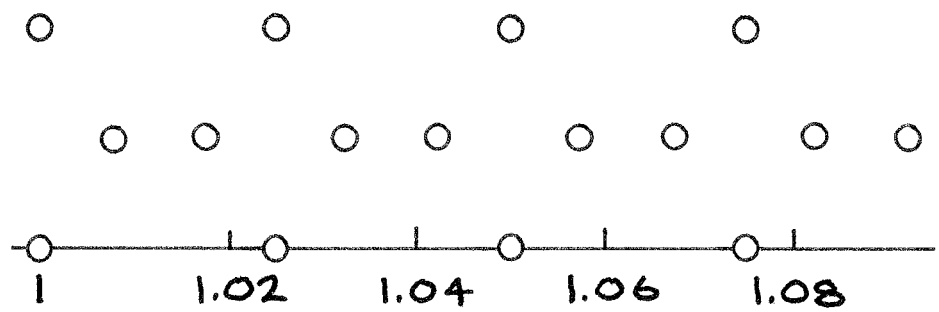
FIG. 9 shows a section of a conductor array that simulates a Halbach array.
Figure 10:
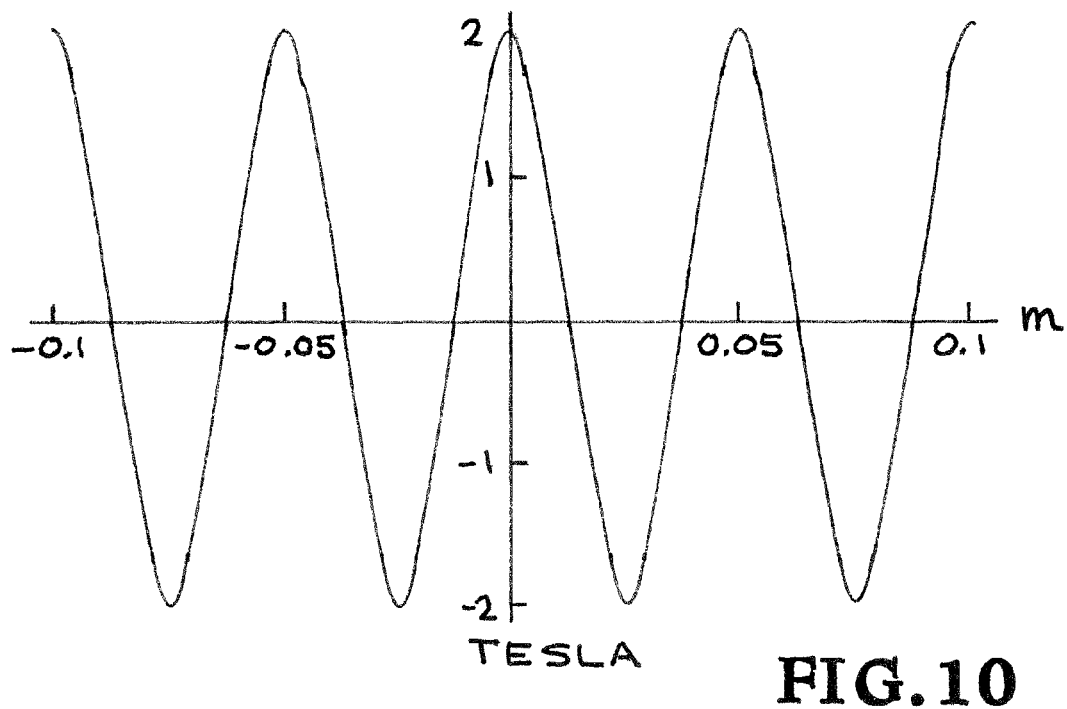
FIG. 10 shows a plot of one component of magnetic field produced by the conductor array shown in FIG. 9.

U.S. patent application Ser. No. 11/932,329 titled "An Improved Electrostatic Generator/Motor," as well as the present disclosure have described new configurations of electrostatic generators that opens up new possibilities for this type of generator. In employing this new configuration to generate output voltages and powers at the levels needed for HVDC transmission, the electric fields between the rotating and stationary components of these generators may become very high, i.e., of order millions of volts per centimeter. In order to operate successfully at such voltages it would be highly advantageous to employ the magnetic insulation concept in the generator. Again, the requirement is that the magnetic field lines needed to achieve magnetic insulation must be directed parallel to the conducting surfaces. Since these surfaces are disc-like in the generators of U.S. patent application Ser. No. 11/932,329, this means that the magnetic field must have only radial or azimuthal components. An example method for creating strong fields having only azimuthal or radial components at the generator electrodes is provided when the magnetic field from a DC current in a cylindrical array of superconductors is located near the axis of rotation of the generator. For example, a total current of 2.5 megamperes flowing in such an array of longitudinal conductors will produce a magnetic field of 1.0 Tesla at a radial distance of 0.5 meters from the axis. FIG. 7 shows that the relativistic magnetron-cutoff equation predicts that a potential of about 2.5 million volts could be maintained between adjacent planar conductors in the presence of such a magnetic field. Another example method for creating strong fields having only azimuthal or radial components at the generator electrodes is provided when the magnetic field from an exterior Halbach array-like magnetic field is produced by an array of axially oriented pairs of conductors each pair of which produces a dipole field approximating that produced by a single block of permanent-magnet material. FIG. 9 shows an example of such an array of conductors, and FIG. 10 shows a plot of one component of the field, together with the equivalent $B_{remanent}$ associated with that array. For axially oriented conductors only radial and azimuthal field components will be generated. The wavelength of the Halbach array (four periods of the conductor array) can be chosen so as to produce the desired level of field at the generator electrodes.

A technique for magnetic insulation of charged conductors in vacuo includes a means for producing the insulating effect over a large area of conductor surface without the need for generating the fields by using conventional magnet coils. These would necessarily have to be of large size and would require large currents to create the required fields. Furthermore, unless the high-voltage conductor configuration has a geometry that is consistent with the field-line direction of the magnetic field (i.e., one where the field lines at the surface of the conductor lie parallel to the surface) no coil configuration would be able to produce the necessary field. The invention consists of shaping the surface of the charged conductors to correspond as closely as possible to the field configuration that is generated by a Halbach array located at the backside of the charged conductor surface where breakdown is to be avoided.

Another technique for magnetic insulation of charged conductors in vacuo is aimed at the objective of enhancing the performance of the new breed of electrostatic generator/motor described in U.S. patent application Ser. No. 11/932,329 titled "An Improved Electrostatic Generator/Motor," filed Oct. 31, 2007, incorporated herein by reference. Here several possible ways of generating the required magnetic fields are provided. The invention thus consists of combining the new E-S generator/motor configuration with means to employ magnetic insulation in order to increase the voltage levels at which the generator/motor can operate.

An alternate geometrical configuration improves voltage breakdown suppression while at the same time simplifying the magnet coil system that generates the magnetic field.

Figure 11:
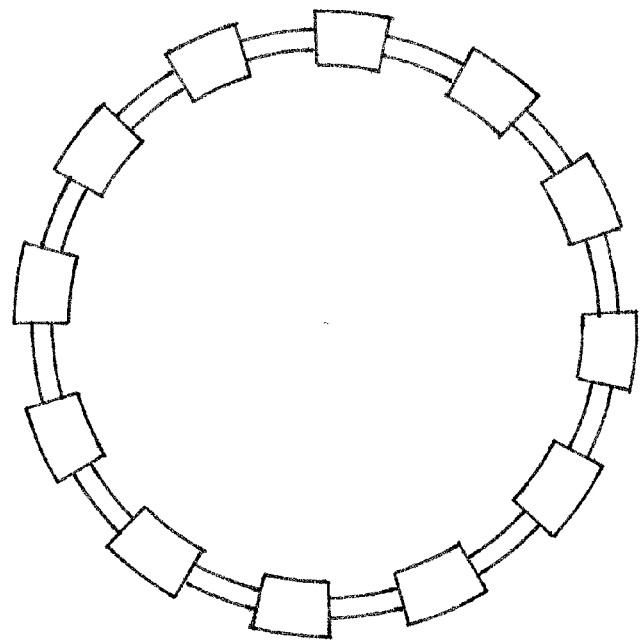
FIG. 11 shows an end view of a nested metallic cylinder.

One embodiment consists of nested metallic cylinders, divided into stationary and rotating ones. The cylinder groups are cantilevered from support structures at their ends. Both the rotating group and the stationary group consist of cylinders the thickness of which varies periodically with azimuth. An end view of such a cylinder is shown schematically in FIG. 11. The larger and smaller parts of the cylinder shown in FIG. 11 can be formed, e.g., from a single metal cylinder. In an actual embodiment, the corners of the thick lands can be rounded to avoid field-enhancement effects that occur at sharp edges in charged conductors.

Outside and inside of each of the above-described rotating cylinders are stationary cylinders the thickness of which varies with the same periodicity as that of the rotating group. Thus, considering a typical group of three of the cylinders, the inner and outer cylinders would be stationary while the one between them would be rotating. As this middle cylinder rotates its thickened portions would alternately become aligned with the thickened portions of the stationary cylinders lying just inside and just outside it (the azimuthal position of maximum capacity), or they would be aligned with the thinner portions of the stationary cylinders (minimum capacity). In another embodiment, the rotating cylinder would be made of dielectric material, rather than metal. The entire assembly would consist of a number of concentric cells of the type described, except that it should be noted that the inner, stationary cylinder of one such cell would also be the outer stationary element of the cell inside the given cell, and vice versa. In a high-power generator/motor, several such concentric cells can be employed.

Electrically, if they are made of conducting material, the rotating cylinders would be grounded electrically (either capacitatively or with electrical brushes), while the stationary cells would be charged positively or negatively. The result would therefore be to create a set of two time-varying capacitors having common grounded electrodes. If desired, the azimuthal orientation of alternate sets of the stationary cylinders could be displaced in phase relative to each other, for example by 180 degrees, thus displacing the maximum and minimum capacity values of the capacitor pairs by half a period.

The capacitor geometry just described has been chosen specifically in order to use strong magnetic fields whose direction is tangent to the conducting surfaces of all the capacitor electrodes in order to greatly increase the inter-electrode breakdown voltage. In the case described here, a solenoid coil that is coaxial with the axis of the generator/motor can generate the required magnetic field. The solenoid coil would typically be located outside its vacuum enclosure. Note that if superconducting coils are employed, they might be located inside the chamber to facilitate the implementation of the required cryogenics.

In these embodiments, it would be relatively straightforward to maintain magnetic fields of 2 Tesla or more within the generator/motor. In such cases the inter-electrode gaps at their minimum points (i.e., when the thickened portions of both the rotating and the stationary cylinders are aligned azimuthally) could be quite small, even when the potentials were very high, e.g., 500 kV, as appropriate for HVDC power transmission.

Figure 12:
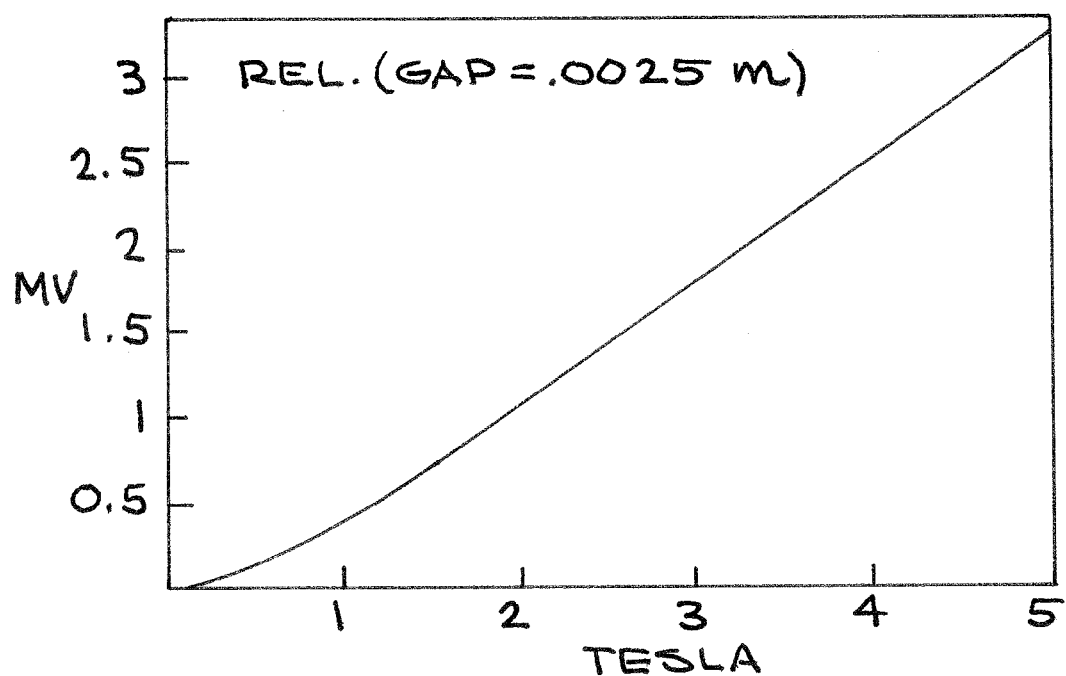
FIG. 12 shows a plot of the relativistic magnetron cutoff voltage as a function of magnetic field, for the case of a gap of 23 mm.

As an example, FIG. 12 shows a plot of the relativistic magnetron cutoff voltage as a function of magnetic field, for the case of a gap of 2.5 mm. As can be seen from the plot, at a field of 2.0 Tesla, the cutoff voltage is approximately 1.0 MV.

As suggested by the numbers above, this new electrostatic generator/motor configuration can be designed to deliver its power at voltages appropriate to HVDC transmission. Thus the AC output of the generator, typically delivered at kilohertz frequencies, would be rectified using solid-state rectifier stacks, to produce a HVDC output a power levels of order tens or hundreds of megawatts. This output could then be directly connected to a HVDC transmission line, with no need for transformer banks at the power station.

In addition to the use of the above-described system as a generator, the same configuration could be operated as a motor. This new electrostatic motor could replace high-horsepower electric motors of the conventional electromagnetic type (e.g., induction motors) by a motor efficiency of which could be substantially higher than that of conventional motors. In an electrostatic motor, the efficiency of the motor itself approaches 100 percent, so that the only significant source of inefficiency would be that associated with the power electronics required to drive it. Using modern solid-state components, the conversion efficiencies (from 60 Hz AC or DV to motor frequencies) can be very high.

In summary, some embodiments of the present invention include a new configuration for an electrostatic generator/motor that uses simple solenoidal coils to generate a strong magnetic field the field lines of which are directed parallel to the surface of the electrodes of the E-S generator/motor. These configurations provide a better means to implement the magnetic suppression of electrical breakdown between the rotating and stationary elements of the generator/motor, even at potentials of order 500 kV, as typical of those used in HVDC transmission line systems.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   at least one central support centered about a central axis;
   a first stator fixedly connected to said at least one central support, wherein said first stator comprises a plurality of first stator elements, wherein at least one first stator element of said plurality of first stator elements has a non-angled edge;
   a second stator fixedly connected to said at least one central support, said second stator comprising a plurality of second stator elements fixedly attached to said at least one central support, wherein at least one second stator element of said plurality of second stator elements has a non-angled edge;
   an outer support rotatably centered about said central axis; and
   a rotor located between said first stator and said second stator, wherein said rotor comprises a plurality of rotor elements in contact with said outer support, wherein at least one rotor element of said plurality of rotor elements has a non-angled edge.

2. The apparatus of claim 1, wherein said at least one first stator element comprises a first stator extension that extends radially from said at least one central support, wherein said at least one second stator element comprises a second stator extension that extends radially from said at least one central support and wherein said at least one rotor element comprises a rotor element extension that extends radially from said outer support toward said axis of rotation.

3. The apparatus of claim 2, wherein at least one of said first stator extension, said second stator extension and said rotor extension comprises a cross-sectional shape selected from the group consisting of a circle and an ellipse.

4. The apparatus of claim 2, wherein at least one of said first stator extension, said second stator extension and said rotor extension comprises a shape selected from the group consisting of a rod and a cylinder.

5. The apparatus of claim 2, wherein at least one of said first stator extension, said second stator extension and said rotor extension is tapered.

6. The apparatus of claim 2, wherein at least one of said first stator extension, said second stator extension and said rotor extension is tapered from a first width near said central axis to a second width radially away from said central axis, wherein said second width is greater than said first width.

7. The apparatus of claim 1, wherein one of said first stator elements or said second stator elements are electrically connected together into two groups, forming thereby a first group of connected stator elements connected to a first electrical lead and a second group of connected stator elements connected to a second electrical lead.

8. The apparatus of claim 7, wherein said first group of connected stator elements are connected in parallel to said first electrical lead and wherein said second group of connected stator elements are connected in parallel to said second electrical lead.

9. The apparatus of claim 7, wherein said first electrical lead is connected to a first capacitor, said apparatus further comprising a first charging circuit attached to said first electrical lead, wherein said first charging circuit comprises a first inductor, wherein said first inductor and first capacitor form an LC circuit resonant within a band of frequencies, wherein when said first rotor rotates, an output at said first electrical lead will have at least one frequency within said band, wherein said second electrical lead is connected to a second capacitor, said apparatus further comprising a second charging circuit attached to said second electrical lead, wherein said second charging circuit comprises a second inductor, wherein said second inductor and second capacitor form a second LC circuit resonant within said band of frequencies, wherein when said second rotor rotates, a second output at said second electrical lead will have at least one frequency within said band.

10. The apparatus of claim 7, wherein at least one of said first electrical lead and said second electrical lead is connected to a capacitor, said apparatus further comprising a charging circuit attached to the one of said first electrical lead and said second electrical lead that is connected to said capacitor, wherein said charging circuit comprises an inductor, wherein said inductor and said capacitor form an LC circuit resonant within a band of frequencies and wherein when said rotor rotates, an output from said one of said first electrical lead and said second electrical lead that is connected to said capacitor will have at least one frequency within said band.

11. The apparatus of claim 10, wherein when said first electrical lead has at least one frequency within said band, said second electrical lead is grounded and wherein when said second electrical lead has at least one frequency within said band, said first electrical lead is grounded.

12. The apparatus of claim 10, wherein when said first electrical lead is connected to said capacitor, said second electrical lead is connected to ground and wherein when said second electrical lead is connected to said capacitor, said first electrical lead is connected to ground.

13. The apparatus of claim 1, wherein at least one of said first stator, said second stator and said rotor comprises a material selected from the group consisting of a dielectric material and metal.

14. The apparatus of claim 1, wherein at least one of said first stator, said second stator and said rotor comprise a metal-coated dielectric material.

15. The apparatus of claim 1, wherein at least one of said first stator, said second stator and said rotor comprise a corrugated surface.

16. The apparatus of claim 15, wherein said corrugated surface comprises an annular disc.

17. The apparatus of claim 15, wherein said corrugated surface comprises a material selected from the group consisting of a dielectric material, a metal and a metal-coated dielectric material.

18. The apparatus of claim 1, further comprising means for said outer support to expand due to rotational forces.

19. The apparatus of claim 18, wherein said means for said outer support to expand due to rotational forces comprises cuts in said outer support, wherein said cuts extend radially partially through said outer support.

20. The apparatus of claim 1, wherein each first stator element of said plurality of first stator elements is spaced apart from each other said each first stator element, wherein each second stator element of said plurality of second stator elements is spaced apart from each other said second stator element and wherein each rotor element of said plurality of rotor elements is spaced apart from each other said each rotor element.

21. An apparatus, comprising:
   at least one central support centered about a central axis;
   a first stator fixedly connected to said at least one central support, wherein said first stator comprises a plurality of first stator elements;
   a second stator fixedly connected to said at least one central support, said second stator comprising a plurality of second stator elements fixedly attached to said at least one central support;
   an outer support rotatably centered about said central axis; and
   a rotor located between said first stator and said second stator, wherein said rotor comprises a plurality of rotor elements in contact with said outer support, wherein each first stator element of said plurality of first stator elements is spaced apart from each other said each first stator element, wherein each second stator element of said plurality of second stator elements is spaced apart from each other said second stator element and wherein each rotor element of said plurality of rotor elements is spaced apart from each other said each rotor element.

* * * * *